United States Patent
Lin

(10) Patent No.: US 9,886,235 B2
(45) Date of Patent: Feb. 6, 2018

(54) AUDIO PLAYBACK DEVICE AND METHOD

(71) Applicant: AmTRAN Technology Co., Ltd., New Taipei (TW)

(72) Inventor: Shih-Pin Lin, Taoyuan (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 10 days.

(21) Appl. No.: 15/052,894

(22) Filed: Feb. 25, 2016

(65) Prior Publication Data

US 2017/0185371 A1   Jun. 29, 2017

(30) Foreign Application Priority Data

Dec. 29, 2015   (TW) .............................. 104144249 A

(51) Int. Cl.
  *H04B 3/00*   (2006.01)
  *H04R 3/00*   (2006.01)
  *G06F 3/16*   (2006.01)
  *H04S 3/00*   (2006.01)
  *H04R 3/12*   (2006.01)
  *H04R 5/04*   (2006.01)

(52) U.S. Cl.
  CPC .............. *G06F 3/165* (2013.01); *H04S 3/008* (2013.01); *H04R 3/12* (2013.01); *H04R 5/04* (2013.01); *H04S 2400/03* (2013.01)

(58) Field of Classification Search
  CPC . H04R 3/12; H04R 5/04; H04R 27/00; H04R 2227/00; H04R 2227/003; H04R 2227/005; H04R 2420/07; H04H 20/83

USPC ............. 381/56, 58, 59, 77, 80, 81, 96, 123; 700/94
  See application file for complete search history.

(56) References Cited

U.S. PATENT DOCUMENTS

| | | | | |
|---|---|---|---|---|
| 6,867,820 B2* | 3/2005 | Jin | ..................... | H04N 5/44513 348/705 |
| 7,162,038 B1* | 1/2007 | Winterer | ............ | H04N 21/8106 348/E5.114 |
| 7,792,311 B1* | 9/2010 | Holmgren | ............... | H04S 7/308 381/17 |
| 8,064,614 B2* | 11/2011 | Sugii | ........................ | H04B 3/54 381/58 |
| 8,175,289 B2* | 5/2012 | Gordon | .................. | H04R 27/00 381/77 |
| 8,231,630 B2* | 7/2012 | Long | .................. | A61B 17/1684 606/79 |
| 8,855,319 B2* | 10/2014 | Liu | .................. | G11B 20/00992 381/17 |
| 8,856,272 B2* | 10/2014 | Baalu | ........................ | H04S 7/30 709/203 |

(Continued)

*Primary Examiner* — Xu Mei
(74) *Attorney, Agent, or Firm* — CKC & Partners Co., Ltd.

(57) ABSTRACT

An audio playback method used in an audio playback device is provided. The audio playback method includes steps outlined below. An audio playback command is received by a processing unit through a network communication unit. A total sound channel number of the audio playback device is determined by the processing unit. A piece of audio data having a specific sound channel number is retrieved by the processing unit through the network communication unit from internet, wherein the specific sound channel number is equal to or larger than the total sound channel number. Audio playback modules are controlled to play an audio by the processing unit according to the audio data.

10 Claims, 2 Drawing Sheets

(56) References Cited

U.S. PATENT DOCUMENTS

| | | | | |
|---|---|---|---|---|
| 8,989,407 | B2* | 3/2015 | Kikkawa | H04S 3/008 330/124 R |
| 2006/0222186 | A1* | 10/2006 | Paige | H04R 27/00 381/81 |
| 2014/0286502 | A1* | 9/2014 | Chen | H04R 3/12 381/81 |

* cited by examiner

AUDIO PLAYBACK DEVICE AND METHOD

RELATED APPLICATIONS

This application claims priority to Taiwanese Application Serial Number 104144249, filed Dec. 29, 2015, which is herein incorporated by reference.

BACKGROUND

Field of Invention

The present invention relates to an audio playback technology. More particularly, the present invention relates to an audio playback device and an audio playback method.

Description of Related Art

Accompanying with maturity of network technologies, music streaming websites can transmit music streams through a network to an audio playback system for playing the music. Many music streams include audio data having compression formats, such as DTS, AC-3, E-AC3 and MC, all of which can support multiple sound channels. However, a modern audio playback system often has expandability and can be connected to or detached from different number of speakers according to a user's requirement. As a result, the total sound channel number may be different due to the adjustment by the user. In that case, when the total sound channel number of the audio playback system does not conform to the audio format provided by the server of the music streaming website, the sound is easily distorted. The optimum playback quality can not be obtained.

Accordingly, what is needed in the industry is a new audio playback device and a new audio playback method for resolving above deficiencies.

SUMMARY

An aspect of the present invention is to provide an audio playback device. The audio playback device has a total sound channel number and includes at least one audio playback module. The audio playback module includes a network communication unit and a processing unit electrically coupled to the network communication unit. The processing unit receives an audio playback command through a network communication unit to retrieve a piece of audio data having a specific sound channel number from internet, so that the audio playback module plays the audio data, wherein the specific sound channel number is equal to or larger than the total sound channel number.

Another aspect of the present invention is to provide an audio playback method used in an audio playback device. The audio playback method includes steps outlined below. An audio playback command is received by a processing unit through a network communication unit. A total sound channel number of the audio playback device is determined by the processing unit. A piece of audio data having a specific sound channel number is retrieved by the processing unit through the network communication unit from internet, wherein the specific sound channel number is equal to or larger than the total sound channel number. The audio playback device is controlled by the processing unit according to the audio data for playing an audio.

The advantages of applying the present disclosure lies in that the audio playback device of the present disclosure can retrieve from internet and play the audio data corresponding to the total sound channel number of the audio playback modules in the audio playback device. Distortion, generated when the channel number of the audio data does not match the total sound channel number of the audio playback modules, can be avoided so as to obtain the best playback effect.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
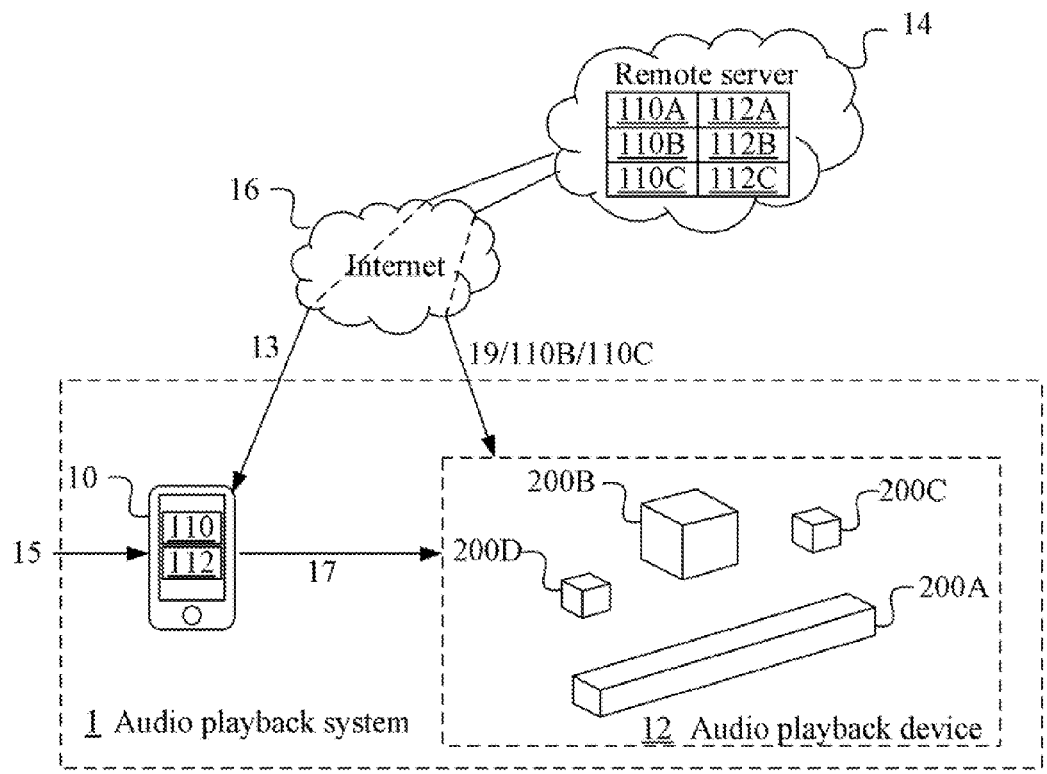
FIG. 1 is a block diagram of an audio playback system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of an audio playback system 1 in an embodiment of the present invention. The audio playback system 1 includes a console electronic device 10 and an audio playback device 12.

The console electronic device 10 can be any electronic device capable of performing wired or wireless communication. In an embodiment, the console electronic device 10 is a handheld electronic device such as, but not limited to a smartphone or a tablet personal computer.

The console electronic device 10 can wirelessly communicate with a remote server 14. More specifically, the console electronic device 10 can wirelessly communicate with the remote server 14 through internet 16. The remote server 14 can be such as, but not limited to a remote music database storing a plurality pieces of audio data for external electronic devices to retrieve and play. In FIG. 1, only the pieces of audio data 110A-110C and 112A-112C are exemplarily illustrated. In other embodiments, the number of the pieces of audio data stored in the remote server 14 is not limited to the number illustrated in FIG. 1.

In an embodiment, the audio data 110A-110C includes a same audio name or title but corresponds to different "specific channel numbers" such as, but not limited to 2 channels, 5.1 channels and 9.1 channels. The audio data 112A-112C includes a same audio name or title distinguished from that of the audio data 110A-110C and corresponds to different "specific channel numbers", such as, but not limited to 5.1 channels, 7.1 channels and 9.1 channels.

In an embodiment, the console electronic device 10 retrieves an audio menu 13 from the remote server 14 through internet 16. The audio menu 13 includes information of the audio data provided by the remote server 14. In an embodiment, the audio menu 13 only lists two audio names or titles 110 and 112 corresponding to the audio data 110A-110C and audio data 112A-112C respectively for the console electronic device 10 to select.

In an embodiment, after the console electronic device 10 receives a selection input 15 from a user, the console electronic device 10 selects the desired audio from the audio menu 13, such as the audio having the audio name or title 110 or 112. In different embodiments, the selection input 15 can be an input from such as, but not limited to a physical button (not illustrated) of the console electronic device 10 or a touch display unit (not illustrated) disposed on the console electronic device 10.

Further, the console electronic device 10 generates an audio playback command 17 according to the selection input 15 and transmits the audio playback command 17 to the audio playback device 12, for controlling the audio playback device 12 to retrieve the desired audio data from the remote server 14 according to the audio playback command 17 and play it.

Figure 2:
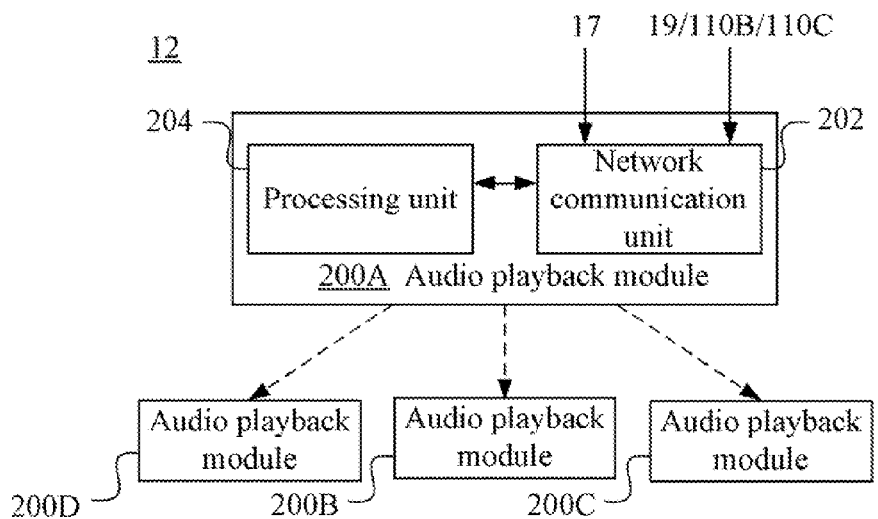
FIG. 2 is a block diagram of the audio playback device in FIG. 1 according to an embodiment of the present invention.

Reference is now made to FIG. 2. FIG. 2 is a block diagram of the audio playback device 12 in FIG. 1 according to an embodiment of the present invention. The audio playback device 12 includes audio playback modules 200A-200D, a network communication unit 202 and a processing unit 204. The audio playback modules 200A-200D include a plurality of sound channels.

In the present embodiment, the audio playback module 200A is a main audio playback module accommodating the network communication unit 202 and the processing unit 204. Each of the audio playback modules 200B-200D is an extended audio playback module connected to the main audio playback module 200A through a wired or wireless form.

The processing unit 204 is electrically coupled to the network communication unit 202 and can communicate with the console electronic device 10 and the remote server 14 through the network communication unit 202. Based on the running of the network communication unit 202 and the processing unit 204, the audio playback modules 200A-200D can receive the audio play back command 17 from the console electronic device 10 and access and play the audio data of the remote server 14. More specifically, the audio playback modules 200A-200D can access and play the audio data of the remote server 14 through the Internet 16 according to the audio playback command 17.

The running mechanism of the network communication unit 202 and, the processing unit 204 is elaborated in the following.

The processing unit 204 receives the audio playback command 17 from the console electronic device 10 through the network communication unit 202. In an embodiment, according to the content of the audio playback command 17, the processing unit 204 obtains the address of the remote server 14 and the desired audio data, such as the name or the title 110, selected from the audio menu 13 by the console electronic device 10 in terms of the selection input 15. In an embodiment, the desired audio data can be selected, as the audio content of the audio data 110A-110C corresponding to the audio name or the 110.

The processing unit 204 further determines the total sound channel number of the audio playback modules 200A-200D.

Each of the audio playback modules 200A-200D may include different number of sound channels. For example, the audio playback module 200A can be a module of 3 channels, the audio playback module 2006 can be a subwoofer module of 0.1 channels, and each of the audio playback modules 200C-200D can be a module of 1 channel. As a result, the total sound channel number of the audio playback modules 200A-200D is 5.1 channels.

The processing unit 204 further retrieves a sound channel data list 19 through the network communication unit 202 from the remote server 14 according to the name or the tile of the desired audio data and the address of the remote server 14. The sound channel data list 19 lists the pieces of audio data relating to the name or the title of the desired audio data and the specific sound channel numbers corresponding to the audio data. For example, the pieces of audio data 110A-110C all include the name or the title of the desired playback data but correspond to 2 channels, 5.1 channels and 9.1 channels respectively. In this case, the content of the sound channel data list 19 presents the audio data 110A-110C and the corresponding 2 channels 5.1 channels and 9.1 channels.

As a result, according to the sound channel data list 19 and the total sound channel number of the audio playback modules 200A-200D, the processing unit 204 retrieves the piece of audio data having the specific sound channel number equal to said total sound channel number from the remote server 14 and takes it as the selected audio data. Since the audio playback modules 200A-200D includes 5.1 channels, the processing unit 204 retrieves the audio data 110B having the 5.1 channels as the selected audio data.

In another embodiment, the processing unit 204 directly transmits the total sound channel number of the audio playback modules 200A-200D to the remote server 14 through the network communication unit 202. Subsequently, the remote server 14 transmits the selected audio data 110B according to the total sound channel number so that the processing unit 204 receives the selected audio data 110B through the network communication unit 202.

Further, the processing unit 204 controls the channels of the audio playback modules 200A-200D to play the audio data according to the selected audio data 110B.

Therefore, the audio playback device 12 of the present disclosure can retrieve the audio data 110B from the remote server 14 and play the audio data 110B corresponding to the total sound channel number of the audio playback modules 200A-400D. Distortion, generated due to mismatch between the channel number of the audio data and the total sound channel number of the audio playback modules 200A-200D, can be avoided. So the optimum playback quality is obtained.

In an embodiment, the number of the audio playback modules included in the audio playback device 12 can be increased or decreased. Thus, with different number of the audio playback modules 200A-200D the total channel number may be different. For example, the audio playback device 12 becomes a system of 3 channels when only the audio playback module 200A is included. In another example, the audio playback device 12 becomes a system of ore than 5.1 channels when additional extended audio playback mode les, other than the audio payback modules 200A-200D, are included.

Consequently, in an embodiment, when none of the specific channel numbers of the pieces of the audio data 110A-110C, stored in the remote server 14, in connection with the desired audio data matches the total sound channel number of the audio playback modules, the processing unit 204 retrieves, from the remote server 14, the piece of audio data having the specific channel number larger than and closest to the total sound channel number for taking as the selected audio data.

For example besides the audio playback modules 200A-200D, two more extended audio playback modules each having 1 channel are connected so that the total channel number of the audio playback device 12 becomes 7.1. However, the pieces of audio data 110A-110C stored in the remote server 14 correspond to 2, 5.1 and 9.1 channels. Now the processing unit 204 retrieves the audio data 110C corresponding to 9.1 channels from the remote server 14 for taking as the selected audio data, so as to control the sound channels of the audio playback modules 200A-200D and the two additional extended audio playback modules to play the audio according to the selected audio data 110C.

As a result when the processing unit 204 controls the audio playback modules to play the audio by retrieving the piece of audio data having the specific channel number larger than and closest to the total sound channel number, the data of the redundant sound channel can be discarded or down mixed to form the data having the channels matching the total sound channel number. Comparing to the technique simulating more channels from less channels for generating extra sound channels that do not exist previously, distortion, generated due to mismatch between the channel number of the audio data and the total sound channel number of the audio playback modules, can be avoided in the present disclosure, so as to obtain the optimum playback quality. Furthermore, by retrieving the piece of audio data having the specific channel number closest to the total sound channel number for playing, waste of decoding resources, network bandwidth and additional power consumption, due to excessive channels, can be avoided as well. The optimum operation efficiency of the hardware, the network and power thus can be achieved.

Figure 3:
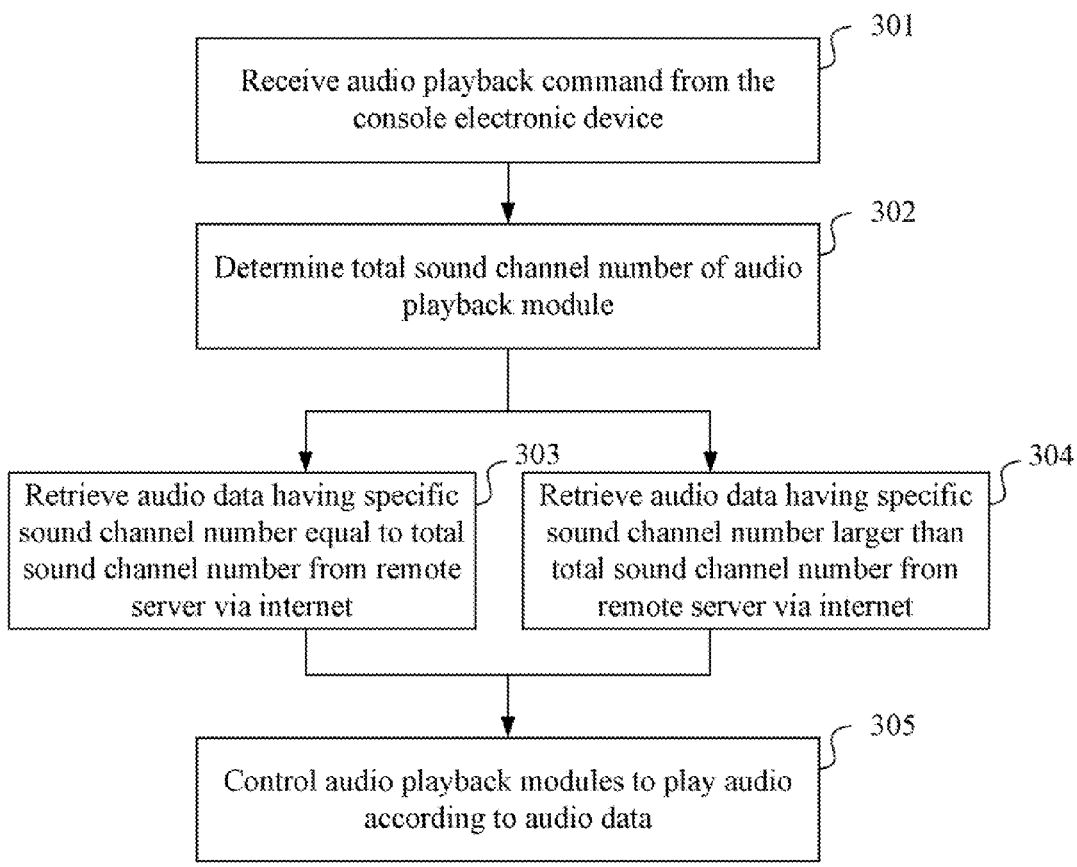
FIG. 3 is a flow chart of an audio playback method in an embodiment of the present invention.

Reference is now made to FIG. 3. FIG. 3 is a flow chart of an audio playback method 300 in an embodiment of the present invention. The audio playback method 300 can be used in the audio playback system 1, especially the audio playback device 12 in FIG. 1. The audio playback method 300 includes steps outlined below. It should be noted that unless the sequence of the steps recited herein is expressly indicated, the sequence of performing the steps is adjustable according to actual requirements, even the steps may be performed simultaneously or synchronously by parts.

In step 301, the audio playback command 17 is received by the processing unit 204 through the network communication unit 202, for obtaining the address of the remote server 14 and the name or the title of the desired audio data.

In step 302, the total sound channel number of the audio playback modules 200A-200D is, determined by the processing unit 204.

In step 303, the pied of audio data 110B having the specific sound channel number equal to the total sound channel number is retrieved, from the remote server 14 via internet, by the processing unit 204 through the network communication unit 202.

If the remote serer 14 does not include the audio data that matches the total sound channel number, the flow goes to step 304 so that the processing unit 204 retrieves, from the remote server 14 via internet, the piece of audio data 110C having the specific sound channel number larger than the total sound channel number through the network communication unit 202.

In step 305, the processing unit 204 controls the audio playback modules 200A-200D to play the audio according to the audio data 110B or 110C.

It should be appreciated that in the steps described above, part of the steps can be repeated or skipped, and the order of the steps can be adjusted depending on practical requirements and are not limited thereto.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio playback device having a total sound channel number and comprising:
    at least one audio playback module comprising:
        a network communication unit; and
        a processing unit electrically coupled to the network communication unit to communicate with a remote server;
    wherein the processing unit retrieves a piece of audio data having a specific sound channel number from the remote server through the network communication unit according to an audio playback command, wherein the piece of audio data is offered to the audio playback device to play an audio, wherein the specific sound channel number is equal to or larger than the total sound channel number, and
    wherein the processing unit further retrieves a sound channel data list through the network communication unit from the remote server according to the audio playback command, wherein the sound channel data list comprises a plurality of pieces of audio data having different sound channel numbers respectively and corresponding to the audio playback command, the processing unit retrieves one of the pieces of audio data having the specific sound channel number equal to or larger than the total sound channel number from the remote server according to the sound channel data list.

2. The audio playback device of claim 1, wherein the at least one audio playback module comprises a main audio playback module to accommodate the network communication unit and the processing unit, wherein the total sound channel number comprises the sound channel number of the main audio playback module.

3. The audio playback device of claim 2, wherein the at least one audio playback module comprises at least one extended audio playback module connected to the main audio playback module through a wired or wireless form, wherein the total sound channel number further comprises the sound channel number of the extended audio playback module.

4. The audio playback device of claim 1, wherein the processing unit transmits the total sound channel number to a remote sever through the network communication unit and subsequently receives the audio data transmitted by the remote server through the network communication unit.

5. The audio playback device of claim 1, wherein the audio playback command is issued from a console electronic device, wherein the console electronic device is a handheld electronic device.

6. An audio playback method used in an audio playback device having a processing unit and a network communication unit, wherein the audio playback method comprises:
    receiving an audio playback command by the processing unit through the network communication unit;
    determining a total sound channel number of the audio playback device by the processing unit;

retrieving a sound channel data list by the processing unit through the network communication unit from a remote server according to the audio playback command, wherein the sound channel data list comprises a plurality of pieces of audio data having different sound channel numbers respectively and corresponding to the audio playback command; and retrieving one of the pieces of audio data having a specific sound channel number equal to or larger than the total sound channel number by the processing unit from the remote server according to the sound channel data list; and controlling the audio playback device by the processing unit according to the one of the pieces of audio data to play an audio.

7. The audio playback method of claim 6, wherein the audio playback device comprises at least one audio playback module that comprises a main audio playback module to accommodate the network communication unit and the processing unit, wherein the total sound channel number comprises the sound channel number of the main audio playback module.

8. The audio playback method of claim 7, wherein the at least one audio playback module comprises at least one extended audio playback module connected to the main audio playback module through a wired or wireless form, wherein the total sound channel number further comprises the sound channel number of the extended audio playback module.

9. The audio playback method of claim 6, further comprising transmitting the total sound channel number by the processing unit to a remote sever through the network communication unit and subsequently receiving the audio data transmitted by the remote server through the network communication unit.

10. The audio playback method of claim 6, wherein the audio playback command is issued from a console electronic device, wherein the console electronic device is a handheld electronic device.

\* \* \* \* \*